United States Patent [19]

Johansson et al.

[11] Patent Number: 5,404,776
[45] Date of Patent: Apr. 11, 1995

[54] APPARATUS FOR TRIMMING A CAN BODY

[75] Inventors: Bert E. Johansson, Arvada; Ray L. Bowles, Golden, both of Colo.

[73] Assignee: Coors Brewing Company, Golden, Colo.

[21] Appl. No.: 52,363

[22] Filed: Apr. 23, 1993

[51] Int. Cl.6 .............................................. B23B 1/00
[52] U.S. Cl. .......................................... 82/53; 82/47; 82/56; 82/58
[58] Field of Search .................... 82/47, 48, 52, 53, 56, 82/57, 58, 88; 83/343

[56] References Cited

U.S. PATENT DOCUMENTS

| | | | |
|---|---|---|---|
| 3,425,251 | 2/1969 | Maytag | 82/53 |
| 3,994,251 | 11/1976 | Hake | 82/47 |
| 4,014,228 | 3/1977 | Dean | 82/47 |
| 4,148,402 | 4/1979 | Atkinson | 82/48 |
| 4,181,050 | 1/1980 | Stroobants | 82/48 |
| 5,054,241 | 10/1991 | Johansson | 82/47 |

*Primary Examiner*—Jack W. Lavinder
*Attorney, Agent, or Firm*—Joseph J. Kelly; Klaas, Law, O'Meara & Malkin

[57] ABSTRACT

Apparatus for trimming away the open end of an untrimmed can body using a plurality of can trimming apparatuses mounted on a rotating turret wherein each can trimming apparatus has a rotatable first shaft having a radially outer or inner knife and a knurling roller mounted thereon for rotation therewith and a second rotatable shaft having a radially inner or outer knife and a knurling segment mounted thereon for rotation therewith and wherein, for each complete revolution of the turret, the first shaft makes three complete revolutions and the second shaft makes one complete revolution. Also, an arrangement of gears is provided for rotating the firs and second shafts.

16 Claims, 5 Drawing Sheets

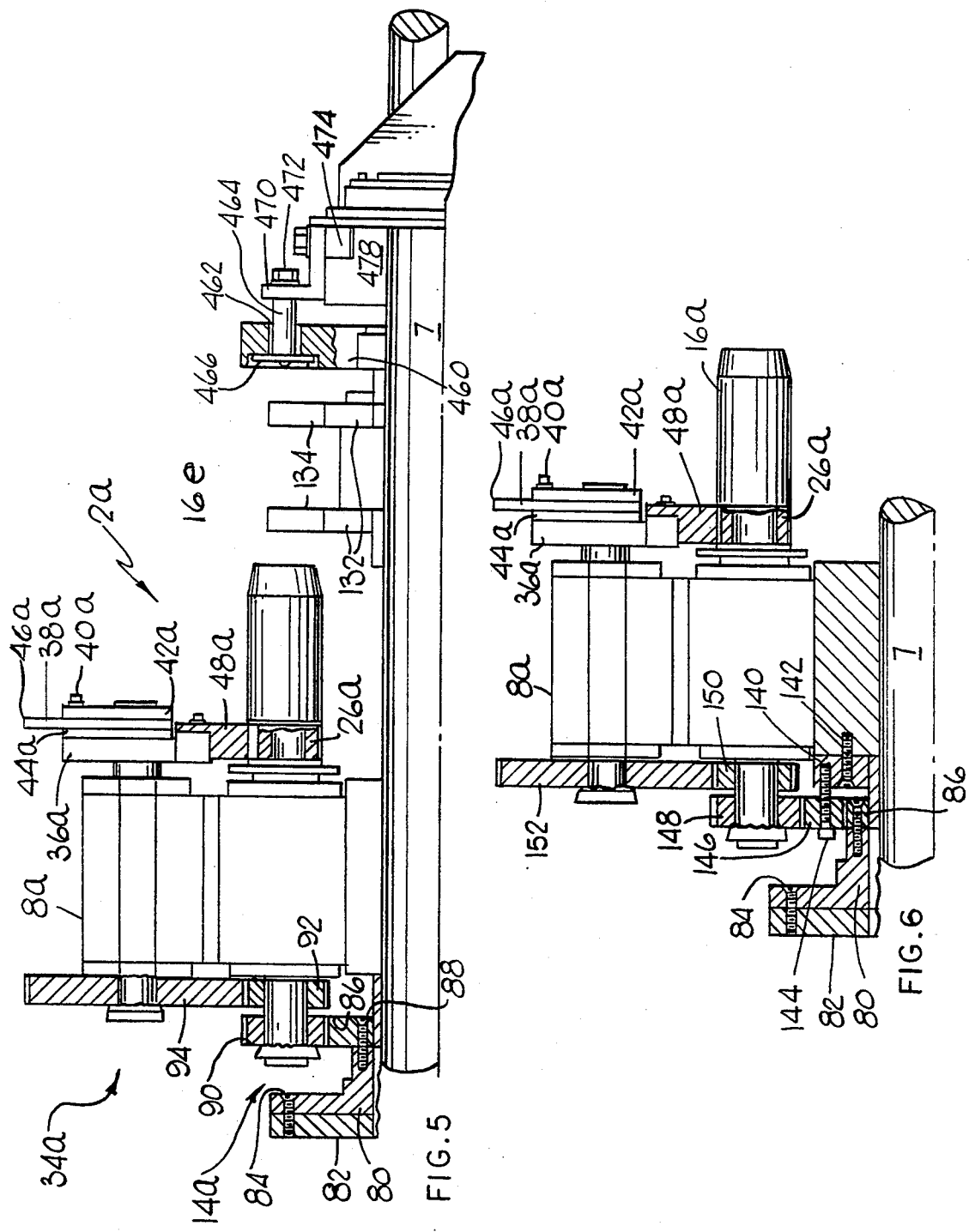

APPARATUS FOR TRIMMING A CAN BODY

FIELD OF THE INVENTION

This invention relates generally to the manufacture of can bodies for use as containers, such as beverage containers, and more particularly to the portion of the manufacturing operation whereat the uneven end of the can body is trimmed to form a can body of the proper axial extent.

BACKGROUND OF THE INVENTION

This invention is an improvement of the apparatus described in U.S. Pat. No. 5,054,341 issued to Johansson et al which patent is incorporated herein by reference thereto. In this patent, a radially outer knife and a first knurling roller are mounted on a first rotatable shaft. The radially outer knife has a cutting edge of 360 degrees. A radially inner knife is mounted on a second rotatable shaft and has a cutting edge having an arcuate extent of at least about 184 degrees to insure that a complete cut is made in the untrimmed can body. A second knurling roller is mounted so as to be moved through an arcuate path into and out of operational relationship with the first knurling rollers. In this patent, for each revolution of the turret, the first shaft makes four complete revolutions and the second shaft makes two complete revolutions. This relationship provided each can trimming apparatus with a 90 degree segment for loading, a 90 degree segment for trimming, a 45 degree segment for push back and blow off, a 90 degree segment for knurling and a 45 degree idle segment. As in all manufacturing operations, it is desirable to operate the apparatus to produce as many products as possible. As the speed of the turret is increased, the time available for loading is decreased which places a limit on the number of can bodies that can be produced in a given period of time.

BRIEF DESCRIPTION OF THE INVENTION

This invention provides apparatus for trimming away a portion of a can body having an uneven edge to produce a can body of desired axial extent wherein a plurality of can trimming apparatuses are removably secured on mounting surfaces of a rotatable turret and wherein each of the can trimming apparatuses has means for trimming away a portion of a can body having an uneven edge and cutting and knurling the trimmed away edge and wherein in the preferred embodiment of the invention, a main drive shaft is rotatably mounted on support structure and rotated by drive means. A turret having a plurality of mounting surfaces is secured to the main drive shaft for rotation therewith. A can trimming apparatus having means for trimming a portion of the can body having an uneven edge and cutting and knurling the trimmed away portion is removably secured on each of the mounting surfaces. Each can trimming apparatus comprises a housing having a radially outer first shaft rotatably mounted therein with the first shaft having exposed first and second end portions and a radially inner second shaft rotatably mounted therein with the second shaft having exposed first and second end portions. A can body supporting means is mounted on the first end portion of the first shaft for rotation therewith and a radially outer knife is also mounted on the first end portion of the first shaft for rotation therewith and is located axially inwardly from the can body supporting means and is positioned to contact the inner surface of the can body. The can body having the uneven edge is supported by the can body supporting means so that a portion having the uneven edge is located on the first shaft axially inwardly from the radially outer knife. A knurling roller is mounted on the first end portion of the first shaft for rotation therewith and has an axial extent in a radially inward direction from the radially outer knife that is greater than the extent of the portion having the uneven edge and has a peripheral portion located within the portion having the uneven edge. A support member is mounted on the first end portion of the second shaft for rotation therewith. A radially inner knife is mounted on the support member for rotation therewith and has an arcuate cutting edge having a radius and an arcuate extent great enough so that it can contact the outer surface of the untrimmed can body and cooperate with the radially outer knife to trim the portion having the uneven edge from the untrimmed can body. Knurling means are mounted on the support member for rotation therewith and has a radius and arcuate extent great to cooperate with the knurling roller to cut and knurl the trimmed away portion. Drive means are provided to rotate the first and second shafts so that for each complete revolution of the turret, the first shaft makes three complete revolutions and the second shaft makes one complete revolution. The turret and the first shaft preferably rotate in a clockwise direction and the second shaft rotates in a counterclockwise direction. However, these directions of rotation could be reversed.

In another preferred embodiment of the invention, the first shaft with the can body supporting means is located at a radially inner position and the second shaft with the knurling means is located at a radially outer position. The drive means for rotating the plurality of first and second shafts comprises a stationary gear having a diameter only slightly greater than the diameter of the main drive shaft. A first gear is mounted on each of the first shafts and is in mesh with the stationary gear so that rotation of the main drive shaft rotates each of the first shafts. Each of the first shafts has a second gear mounted thereon for rotation therewith and is in mesh with one of the first gears so that rotation of the main drive shaft rotates each of the second gears. Each of the second shafts is mounted on the turret so that a third gear on the second shaft is in mesh with one of the second gears so that rotation of the main drive shaft rotates the second shafts.

In another preferred embodiment of the invention, the first shaft with the can body supporting means is located at a radially inner position and the second shaft with the knurling means is located at a radially outer position. The drive means for rotating the plurality of first and second shafts comprises a stationary gear having a diameter only slightly greater than the diameter of the main drive shaft. A ring is secured to the main drive shaft for rotation therewith and has mounting means for rotatably mounting a plurality of first gears at circumferentially spaced apart locations. Each of the first gears is in mesh with the stationary gear so that rotation of the main drive shaft rotates each of the first shafts, Each of the first shafts is mounted on the turret so that a second gear on the first shaft is in mesh with one of the first gears so that rotation of the main drive shaft rotates each of the first shafts, A third gear is mounted on the first shaft for rotation therewith, Each of the second shafts is mounted on the turret so that a fourth gear on the second shaft is in mesh with one of the third gears so that rotation of the main drive shaft rotates the second shafts.

BRIEF DESCRIPTION OF THE DRAWINGS

An illustrative and presently preferred embodiment of the invention is shown in the accompanying drawings in which:

FIG. 5 is a front elevational view with parts in section of another preferred embodiment of a can trimming apparatus of this invention;

FIG. 6 is a front elevational view with parts in section of another preferred embodiment of a can trimming apparatus of this invention;

DETAILED DESCRIPTION OF THE INVENTION

Figure 1:
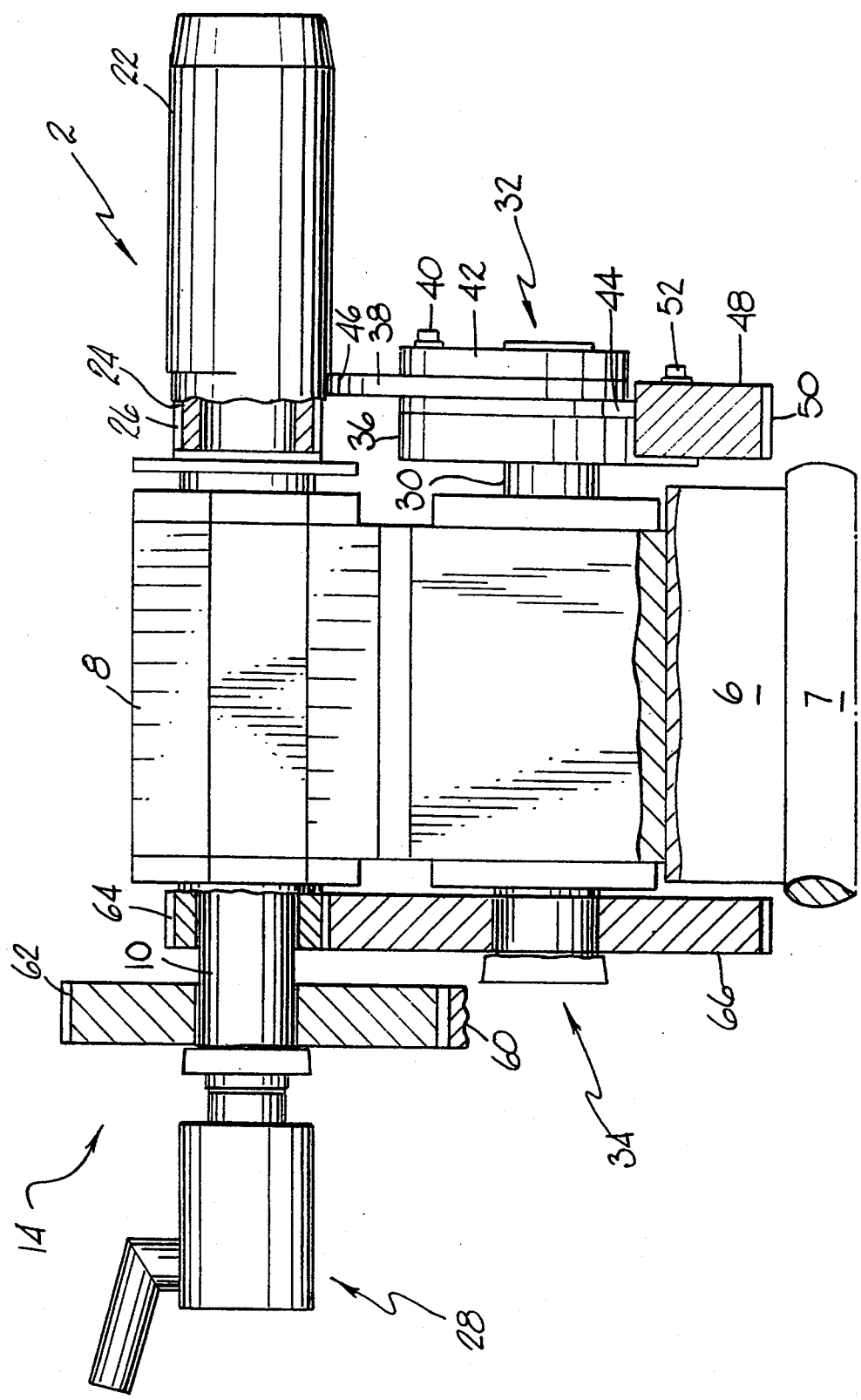
FIG. 1 is a front elevational view with parts in section of a preferred embodiment of a can trimming apparatus of the invention in the can trimming relationship.
Figure 2:
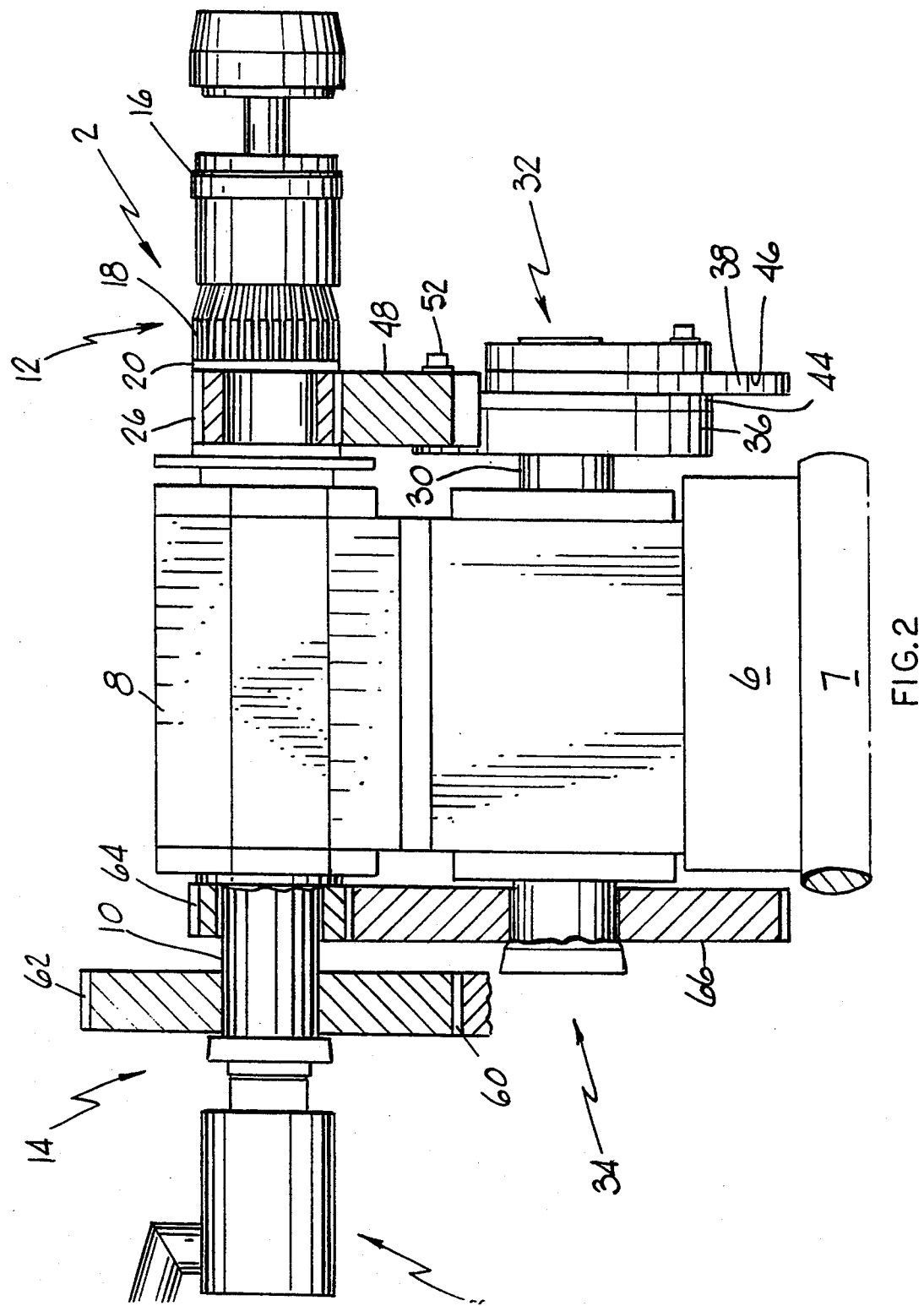
FIG. 2 is a front elevational view with parts in section of the can trimming apparatus of FIG. 1 with the can trimming apparatus in a cutting and knurling relationship.

In FIGS. 1 and 2, there is illustrated can trimming apparatus 2 of this invention which is to be mounted on one of a plurality of mounting surfaces 4 on a turret 6 mounted on the main drive shaft 7 for rotation therewith similar to the mounting of the can trimming apparatus 32 in the Johansson et al patent. In the Johansson et al patent, four can trimming apparatuses are illustrated and in FIGS. 4 and 7, three and six can trimming apparatuses are illustrated but it is understood that any number of can trimming apparatuses can be mounted on the turret until the overall size becomes too great.

Each can trimming apparatus 2 has a housing 8 which is mounted on one of the mounting surfaces 4 on the turret 6 for rotation therewith. A first shaft 10 is rotatably mounted in the housing 8 and has a first end portion 12 and a second end portion 14. A can body supporting means 16, comprising a plurality of resilient fingers 18 capable of moving between two fixed stops, is mounted on the first end portion 12 for rotation therewith. A radially outer knife 20 is mounted at a fixed location on the first end portion 12 for rotation therewith and is located axially inwardly from the can body supporting means 16. An untrimmed can body 22, FIG. 1, having an uneven edge 24 is supported on the can body supporting means 16 so that the portion having the uneven edge is located axially inwardly from the radially outer knife 20 which knife 20 is positioned to contact the inner surface of the untrimmed can body 22 during the cutting operation. A knurling roller 26 is mounted on the first end portion 12 for rotation therewith at a location axially inwardly from the radially outer knife 20 and has an axial extent that is greater than the portion having the uneven edge 24 to be trimmed away and has a portion of its periphery located within the portion having the uneven edge 24. The radially outer knife 20 and the knurling roller 26 are in a side-by-side relationship. The knurling roller 26 has an outer diameter which is slightly less than the outer diameter of the radially outer knife 20 for the cutting operation described below. Conventional means 28 are provided for providing a vacuum or supplying air under pressure for use as described in the Johansson et al patent.

Figure 3:
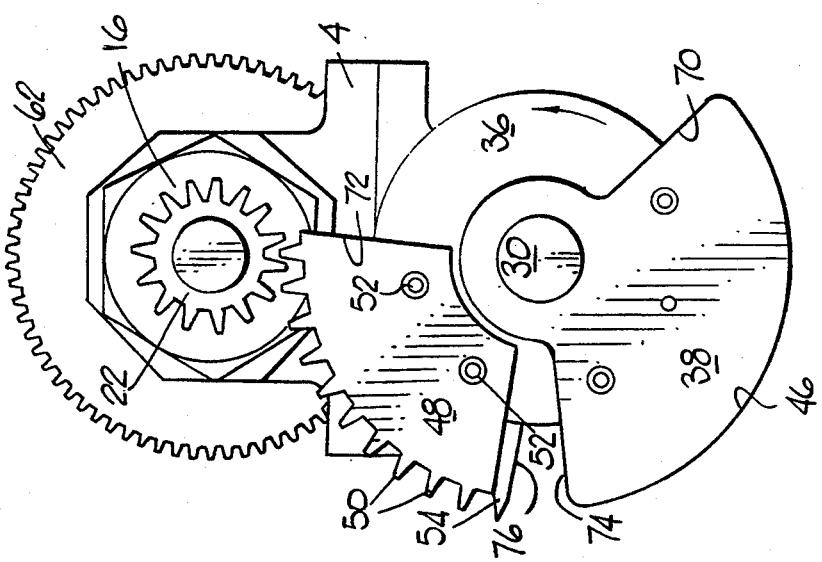
FIG. 3 is a side elevational view from the right side of FIG. 2 with parts removed.

A second shaft 30 is rotatably mounted in the housing 8 at a location that is radially inwardly from the first shaft 10 and has a first end portion 32 and a second end portion 34. A support member 36 is mounted on the second shaft for rotation therewith. A radially inner knife 38, FIG. 3, is mounted on the support member 36 using bolts 40 which pass through openings (not shown) in a clamping plate 42, the radially inner knife 38, an annular shim member 44 and are threaded by secured in threaded openings (not shown) in the support member 36. The radially inner knife 38 has an arcuate cutting edge 46. A knurling segment 48 having knurling teeth 50 on its outer surface is secured to the support member 36 using threaded bolts 52 passing through openings in the knurling segment 48 the annular shim member 44 and secured in threaded openings (not shown) in the support member 36. A knife 54 is secured to the knurling segment 48 using threaded bolts and threaded openings (not shown).

The drive means for rotating the first and second shafts 10 and 30 are similar to the drive means in the Johansson et al patent and comprise a stationary gear 60, a first gear 62 mounted on the first shaft 6 for rotation therewith and in mesh with the stationary gear 60 so that, as the turret rotates, the first gear 62 is rotated. A second gear 64 is mounted on the first shaft 10 at a location between the first gear 62 and the housing 4 for rotation with the first shaft 10. A third gear 66 is mounted on the second end portion 34 of the second shaft 30 for rotation therewith and is in mesh with the second gear 64 so that rotation of the second gear 64 rotates the third gear 66 to rotate the second shaft 30. The stationary gear 60, the first gear 62, the second gear 64 and the third gear 66 are sized so that for each complete revolution of the turret 6, the first shaft 10 makes three complete revolutions and the second shaft 30 makes one complete revolution. In a preferred embodiment, the radially outer knife 20 rotates in a clockwise direction and the support member 36, the radially outer knife 38 and the knurling segment 48 rotate in a counter-clockwise direction.

Figure 4:
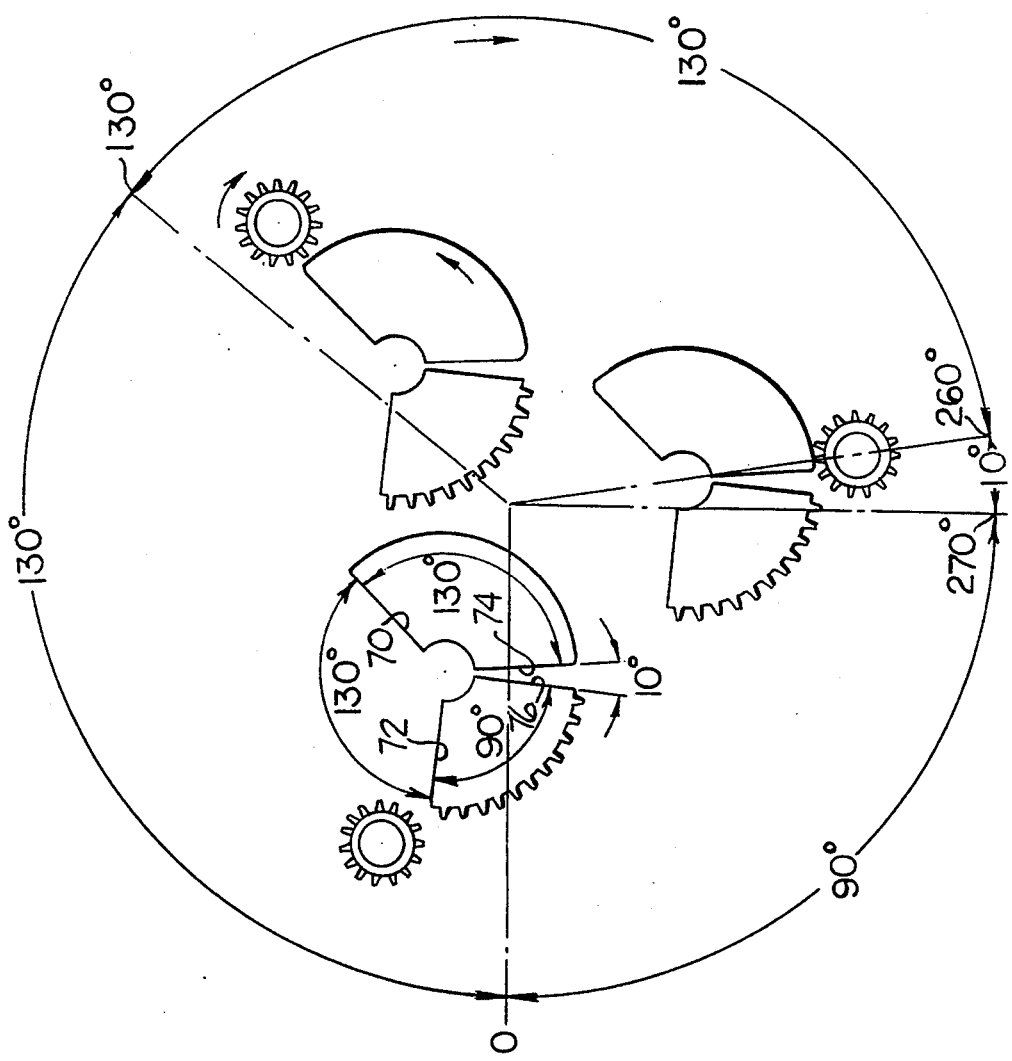
FIG. 4 is a schematic illustration of the relative position of the cutting knives and knurling means during each revolution of the turret.

The operation of the apparatus is schematically illustrated in FIG. 4 wherein the turret 6 and the knife 20 are rotating in a clockwise direction and the knife 38 and the knurling segment 48 are rotating in a counter-clockwise direction. Since the turret 6 and the radially outer knife 38 and knurling segment 48 are moving through one revolution in opposite directions, the radially outer knife 38 and the knurling segment 48 remain in the same position relative to the turret 6. The loading of an untrimmed can body 22 onto the can body supporting means 16 is commenced at the 0 degree location using apparatus similar to either of the two loading means disclosed in the Johansson et al patent. As illustrated in FIG. 4, the leading portion 70 of the radially inner knife 38 and trailing portion 72 the knurling segment 48 are located so that the loading operation has a 130 degree segment for loading a can body 22 onto the can supporting means 16. At the 130 degree location, leading portion 70 of the arcuate cutting edge 46 of the radially inner knife 38 moves into cutting relationship with the radially outer knife 20. The distance between the axis of rotation of the first shaft 10 and the axis of rotation of the second shaft 30 is about 5.0 inches. The radius of the radially outer knife 20 is slightly greater than 1.250 inches and the radius of the radially inner knife 38 is slightly greater than 3.750 inches to provide an overlap therebetween during the cutting operation of about 0.0005 inch. Also, there is a side clearance between the radially outer knife 20 and the radially inner knife 38 of about 0.0003 inch. The arcuate cutting edge 46 of the radially inner knife has an arcuate extent of 130 degrees. As stated above, the first shaft 10 rotates three complete revolutions while the second shaft 30 is rotating one complete revolution. Therefore, the arcuate extent of the arcuate cutting edge 46 needs only to be 120 degrees. The extra ten degrees insures that a complete cut of the untrimmed can body 20 is made. The trailing portion 74 of the radially inner knife 38 and the leading portion 76 of the knife 54 are spaced apart a distance of about 10 degrees. Therefore, between the 260 degree location and the 270 degree location, the trimmed can body is blown off the can body supporting means 16. The trimmed can body is removed using apparatus similar to that disclosed in the Johansson et al patent. At the 270 degree location, the knife 54 moves into contact with the trimmed away portion and cooperates with the knurling roller 26 to cut the trimmed away portion and thereafter the knurling roller 26 and the knurling segment 48 knurl the cut and trimmed away portion. The knurling segment 48 has an arcuate extent of 90 degrees. However, since the cut and trimmed away portion is shortened as it is being knurled, the knurling operation can be completed with a knurling segment 48 of less than 90 degrees.

The apparatus described above can be easily modified to provide more than a 130 degree loading segment. The arcuate extent of the arcuate cutting edge 46 could be reduced to 124 degrees and still have enough overlap to ensure the complete cut of the untrimmed can body. Also, as described above, the knurling segment 48 can be reduced to less than 90 degrees. Also, if the depth of the tooth pattern on the knurling means is increased, the knurling segment 48 can be reduced. Therefore, the loading segment can be increased to over 136 degrees.

In FIG. 5, there is illustrated another preferred embodiment of the invention which uses structures corresponding to those in FIGS. 1-4 except that the relative locations of the first and second shafts 10 and 30 are reversed.

Each can trimming apparatus 2a has a housing 8a which is mounted on one of the mounting surfaces 4a on the turret 6a for rotation therewith. A first shaft 10a is rotatably mounted in the housing 8a and has a first end portion 12a and a second end portion 14a. A can body supporting means 16a, comprising a plurality of resilient fingers 18a capable of moving between two fixed stops, is mounted on the first end portion 12a for rotation therewith. A radially inner knife 20a is mounted at a fixed location on the first end portion 12a for rotation therewith and is located axially inwardly from the can body supporting means 16a. An untrimmed can body 22a, FIG. 5, is supported on the can body supporting means 16a so that the portion having the uneven edge is located axially inwardly from the radially inner knife 20a which knife 20a is positioned to contact the inner surface of the untrimmed can body 22a during the cutting operation. A knurling roller 26a is mounted on the first end portion 12a for rotation therewith at a location axially inwardly from the radially inner knife 20a and has an axial extent that is greater than the portion having the uneven edge to be trimmed away and has a portion of its periphery located within the portion having the uneven edge. The radially inner knife 20a and the knurling roller 26a are in a side-by-side relationship. The knurling roller 26a has an outer diameter which is slightly less than the outer diameter of the radially inner knife 20a for the cutting operation described below. Conventional means, as in FIGS. 1 and 2, are provided for providing a vacuum or supplying air under pressure for use as described in the Johansson et al patent.

A second shaft 30a is rotatably mounted in the housing 8a at a location that is radially outward from the first shaft 10a and has a first end portion 32a and a second end portion 34a. A support member 36a is mounted on the second shaft 30a for rotation therewith. A radially outer knife 38a, FIG. 5, is mounted on the support member 36a using bolts 40a which pass through openings in a clamping plate 42a, the radially outer knife 38a, an annular shim member 44a and are threaded by secured in threaded openings in the support member 36a. The radially inner knife 38a has an arcuate cutting edge 46a. A knurling segment 48a, FIG. 7, having knurling teeth 50a on its outer surface is secured to the support member 36a using threaded bolts 52a passing through openings in the knurling segment 48a the annular shim member 44a and secured in threaded openings in the support member 36a. A knife 54a is secured to the knurling segment 48a using threaded bolts and threaded openings (not shown).

The drive means for rotating the first and second shafts 10a and 30a differ from the drive means described above and in the Johansson et al patent. A support member 80 is secured to the fixed frame 82 using a plurality of threaded bolts 84. A stationary gear 86 is secured to the support member 80 using a plurality of threaded bolts 88. As illustrated in FIG. 5, the diameter of the stationary gear 86 is only slightly larger than the diameter of the main drive shaft 7. A first gear 90 is fixedly mounted on each first shaft 10a and is in mesh with the stationary gear 86 so that rotation of the main drive shaft 7 rotates the first gears 90. A second gear 92 is fixedly mounted on each first shaft 10a for rotation therewith. A third gear 94 is fixedly mounted on the second shaft 30a and is in mesh with the second gear 92 so that rotation of the second gears 92 rotates the third gears 94. The diameter of the third gear 94 is three times the diameter of the second gear 92 so that, for each revolution of the main drive shaft 7, the first shaft 10a makes three complete revolutions and the second shaft 30a makes one complete revolution.

Figure 7:
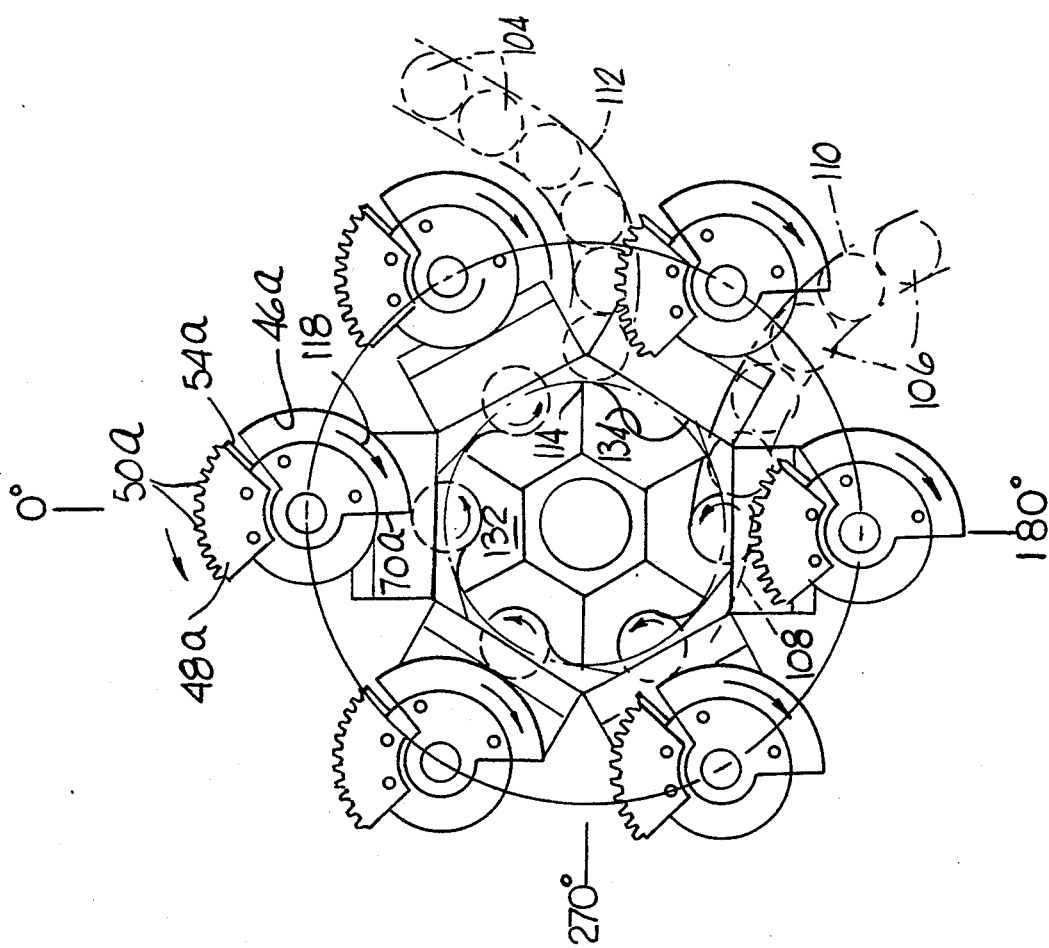
FIG. 7 is a front elevational view of the can feeding system.

In FIGS. 5 and 7, there is illustrated apparatus for feeding untrimmed can bodies 104 into each can trimming apparatus 2a and for removing trimmed can bodies 106. The apparatus illustrated in FIG. 5 is similar to the apparatus in FIGS. 18-20 of the Johansson et al patent and the same reference numerals as in the Johansson et al patent are applied thereto. An annular member 460 is mounted on the main drive shaft 7 for rotation therewith. The annular member 460 has a plurality of circumferentially, spaced apart openings 462 (only one of which is shown) having a longitudinal axis aligned with the longitudinal axis of the can body supporting means 16a. The openings 462 correspond in number with the pockets 134 of the star wheels 132 and are aligned therewith. A shaft 464 is mounted for sliding reciprocating movement through an opening 462. At one end, the shaft has a flange portion 466 for contacting the annular rim portion of the closed end of the untrimmed can body. An L-shaped support member 470 is secured to the other end of the shaft 464 by a threaded nut 472. A cam follower 474 is rotatably mounted on the L-shaped support member 470 and is located to contact the cam surface 476. The cam surface 476 is formed on an annular support member 478 fixedly mounted on the bearing block. The cam follower 474 in the cam surface 474 functions to move an untrimmed can body 104 over the can supporting means 16a so that it may be drawn onto the can body support means 16a in a conventional way using vacuum. At about the 210 degree mark on FIG. 7, the trimmed can body 106 is blown off the can body supporting means 16a and is moved over a support 108 by a pocket 134 until it moves over the discharge chute 110.

The operation of the apparatus of FIG. 5 is illustrated in FIG. 7 wherein the turret is rotating in a counter-clockwise direction as indicated by the arrow 116 and the arcuate cutting edge 46a and the knurling segment 48a are rotating in a clockwise direction as indicated by the arrow 118. As described above in relation to FIG. 4, the arcuate edge 46a and the knurling segment 48a remain in the same position relative to the turret during the revolution of the turret. The untrimmed can bodies 104 in the loading chute 112 are urged by gravity into contact with the periphery 114 of the star wheels 132. As a star wheel pocket 134 moves opposite an untrimmed can body 104, the untrimmed can body 104 moves into the star wheel pocket 134 for movement therewith. This occurs at about the 90 degree location on FIG. 7. As the untrimmed can body 104 moves toward the 0 degree location on FIG. 7, it is moved onto the can supporting means 16a, as described above. Although the angle between the leading portion 70a of the knife 38a and the trailing portion 72a of the knurling bracket 48a are spaced apart about 130 degrees as described in relation to FIG. 4, the loading of the untrimmed can body 104 in FIG. 7 is accomplished in 90 degrees. At about the 0 degree mark, the cutting edge 46a moves into contact with the outer surface of the untrimmed can body 104 to begin the trimming operation, as described above. The trimming operation is finished at about the 235 degree mark in FIG. 7. Actually, the complete cut is made before this location. At about the 210 degree mark, the trimmed can body 106 is blown off of the can body supporting means 16a and is moved over the support 108 by the star wheel pocket 134 and at about the same location, the cutting and knurling operation is commenced. At about the 170 degree mark, the trimmed can body 106 moves into the discharge chute 110. The star wheel 132 continues to rotate to commence another can trimming operation.

In FIG. 6, the drive means for rotating the first and second shafts 10a and 30a differ from the drive means illustrated in FIG. 5. The support member 80, the fixed frame 82, the plurality of threaded bolts 84, the stationary gear 86 and the plurality of threaded bolts 88 are the same as in FIG. 5, except the diameter of the stationary gear 86 is only slightly larger than the diameter of the main drive shaft 7. A gear cluster ring 140 is mounted on the turret 6a using a plurality of threaded bolts 142. A plurality of axles 144 are mounted on the gear cluster ring 140 at circumferentially spaced apart locations. There are as many axles 144 as there are can processing apparatuses 2a. A first gear 146 is rotatably mounted on each axle 144 and is in mesh with the stationary gear 86 so that rotation of the main drive shaft 7 rotates the first gears 146. A second gear 148 is fixedly mounted on each first shaft 10a and is in mesh with the first gear 146 so that rotation of the first gears 146 rotate the second gears 148. The diameter of the first and second gears 146 and 148 are substantially of the same size. A third gear 150 is mounted on the first shaft 10a for rotation therewith and has a diameter slightly smaller than the diameter of the second gear 148. A fourth gear 152 is fixedly mounted on the second shaft 30a and is in mesh with the third gear 150 so that rotation of the third gears 150 rotates the fourth gears 152. The diameter of the fourth gear 152 is three times the diameter of the third gear 150 so that, for each revolution of the main drive shaft 7, the first shaft 10a makes three complete revolutions and the second shaft 30a makes one complete revolution.

Figure 8:
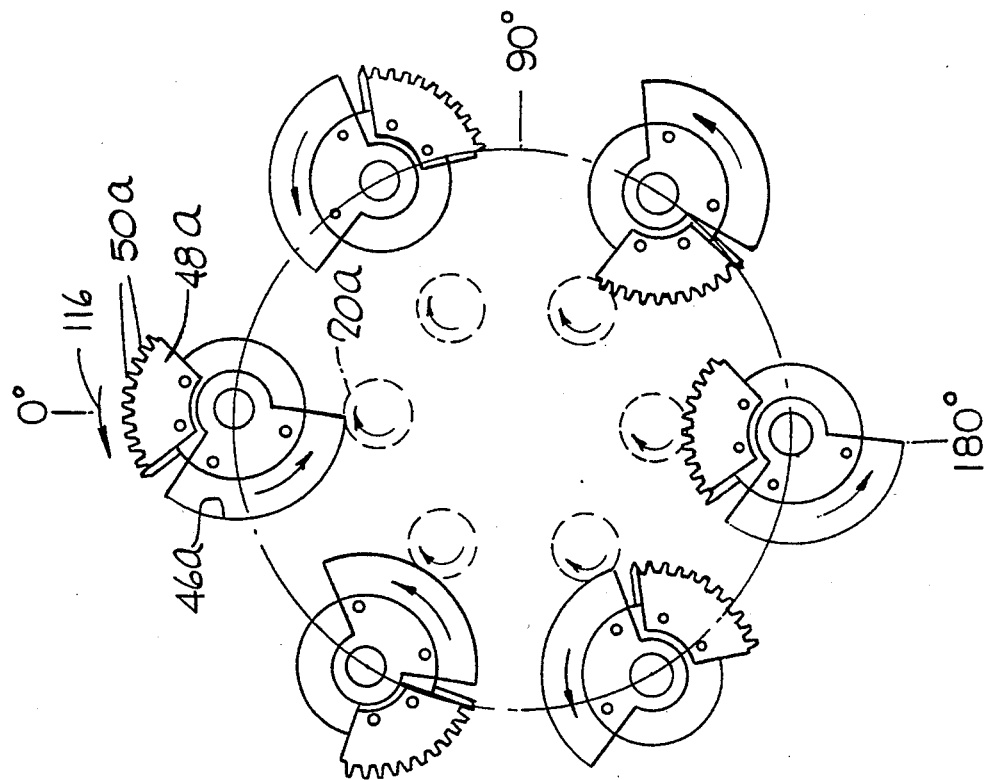
FIG. 8 is a schematic illustration of the can feeding and removal system.

The operation of the apparatus of FIG. 6 is illustrated in FIG. 8 and is the same as that illustrated in FIG. 7 except that the arcuate cutting edge 46a and the knurling segment 48a are rotating in the same counter-clockwise direction 116 as the turret. Therefore, the position of the arcuate cutting edge 46a and the knurling segment 48a relative to the turret changes. The knife 20a rotates in a clockwise direction. The change in the direction of rotation is the result of the first gear 146. The only difference in the cutting and knurling operation is that the knurled trimmed away portion is discharged to the left in FIG. 8 and is discharged to the right in FIG. 7.

In the above described apparatus, the radially inner knife is located between the radially outer knife and the uneven edge during the cutting operation. In the Johansson et al patent, the radially outer knife is located between the radially inner knife and the uneven edge. The arrangement of the Johansson et al patent can be used in accordance with the concepts of this invention by adding the push back apparatus of the Johansson et al patent and increasing the distance between the trailing portion of the radially inner knife and the leading portion of the knurling segment.

What is claimed is:

1. Apparatus for trimming away a portion of a can body having an uneven edge on the open end thereof to form a can body of a desired axial extent comprising:

a support structure;

a main drive shaft rotatably mounted on said support structure;

drive means for rotating said main drive shaft;

a turret having a plurality of mounting surfaces secured to said main drive shaft for rotation therewith;

a can processing apparatus removably mounted on each of at least two of said mounting surfaces for rotation with said turret;

loading and unloading means for loading an untrimmed can body having an uneven edge on the open end thereof onto each of said can processing apparatuses and removing a trimmed can body from each of said can processing apparatuses;

each of said can processing apparatuses having a can trimming apparatus having cutting means for trimming away a portion of said can body having said uneven edge and knurling apparatus having cutting and knurling means for cutting and knurling said trimmed away portion of said can body; and wherein each of said can processing apparatuses comprises:

a housing mounted on said mounting surface;

a first shaft rotatably mounted in said housing and having first and second end portions and a relatively fixed central axis of rotation;

can body supporting means mounted on said first end portion for rotation therewith for supporting said untrimmed can body;

said can trimming apparatus having first cutting means comprising a radially outer knife mounted at a fixed location on said first end portion of said first shaft for rotation therewith and located axially inwardly from said can body supporting means;

said can body supporting means supporting said untrimmed can body so that said radially outer knife is located within said untrimmed can body;

said knurling apparatus having a knurling roller mounted on said first shaft for rotation therewith and having an axial extent greater than said portion to be trimmed away and having said uneven edge;

a second shaft rotatably mounted in said housing and having first and second end portions and having a relatively fixed central axis of rotation which is substantially parallel to said central axis of rotation of said first shaft;

said second shaft being located radially inwardly from said first shaft;

additional drive means for driving said first and second shafts so that for each revolution of said turret said first shaft makes three complete revolutions and said second shaft makes one complete revolution;

a radially inner knife having an arcuate cutting edge having a radius and an arcuate extent great enough so that it can contact the outer surface of said untrimmed portion and cooperate with said radially outer knife to trim said portion having said uneven edge from said trimmed can body;

first mounting means for mounting said radially inner knife on said second shaft for rotation therewith;

knurling means for cooperating with said knurling roller to cut and knurl said trimmed away portion; and second mounting means for mounting said knurling means on said second shaft for rotation therewith.

2. Apparatus as in claim 1 and further comprising:

said arcuate cutting edge having a leading portion and a trailing portion;

said knurling means comprise an arcuate segment having a leading portion and a trailing portion;

said leading portion of said arcuate segment being circumferentially spaced from said trailing portion of said arcuate cutting edge; and said leading portion of said arcuate cutting edge being circumferentially spaced from said trailing portion of said arcuate segment.

3. Apparatus as in claim 2 wherein:

said circumferential distance between said leading portion of said arcuate cutting edge and said trailing portion of said arcuate segment is substantially greater than the circumferential distance between said leading portion of said arcuate segment and said trailing portion of said arcuate cutting edge.

4. Apparatus as in claim 3 wherein:

said arcuate cutting edge having an arcuate extent of sufficient length to ensure that it is in cutting relationship with said radially outer knife for more than 360 degrees.

5. Apparatus as in claim 4 wherein:

said arcuate edge is located between said radially outer knife and said portion of said can body having an uneven edge during the cutting operation.

6. Apparatus as in claim 1 wherein said first and second mounting means comprise:

support means mounted on said second shaft for rotation therewith;

said radially inner knife having a body portion and said arcuate edge;

first securing means for securing said body portion to said support means;

said knurling means having a body portion and said arcuate segment; and second securing means for securing said body portion of said knurling mean to said support means.

7. Apparatus as in claim 6 and further comprising:

said arcuate cutting edge having a leading portion and a trailing portion;

said knurling means comprise an arcuate segment having a leading portion and a trailing portion;

said leading portion of said arcuate segment being circumferentially spaced from said trailing portion of said arcuate cutting edge; and said leading portion of said arcuate cutting edge being circumferentially spaced from said trailing portion of said arcuate segment.

8. Apparatus as in claim 7 wherein:

said circumferential distance between said leading portion of said arcuate cutting edge and said trailing portion of said arcuate segment is substantially greater than the circumferential distance between said leading portion of said arcuate segment and said trailing portion of said arcuate cutting edge.

9. Apparatus as in claim 8 wherein:

said arcuate cutting edge having an arcuate extent of sufficient length to ensure that it is in cutting relationship with said radially outer knife for more than 360 degrees.

10. Apparatus as in claim 9 wherein:

said arcuate edge is located between said radially outer knife and said portion of said can body having an uneven edge during the cutting operation.

11. Apparatus for trimming away a portion of a can body having an uneven edge on the open end thereof to form a can body of a desired axial extent comprising:

a support structure;

a main drive shaft rotatably mounted on said support structure;

drive means for rotating said main drive shaft;

a turret having a plurality of mounting surfaces secured to said main drive shaft for rotation therewith;

a can processing apparatus removably mounted on each of at least two of said mounting surfaces for rotation with said turret;

loading and unloading means for loading an untrimmed can body having an uneven edge on the open end thereof onto each of said can processing apparatuses and removing a trimmed can body from each of said can processing apparatuses;

each of said can processing apparatuses having a can trimming apparatus having cutting means for trimming away a portion of said can body having said uneven edge and knurling apparatus having cutting and knurling means for cutting and knurling said trimmed away portion of said can body; and wherein each of said can processing apparatuses comprises:

a housing mounted on said surface;

a first shaft rotatably mounted in said housing and having first and second end portions and a relatively fixed central axis of rotation;

can body supporting means mounted on said first end portion for rotation therewith for supporting said untrimmed can body;

said can trimming apparatus having first cutting means comprising a radially inner knife mounted at a fixed location on said first end portion of said first shaft for rotation therewith and located axially inwardly from said can body supporting means;

said can body supporting means supporting said untrimmed can body so that said radially inner knife is located within said untrimmed can body;

said knurling apparatus having a knurling roller mounted on said first shaft for rotation therewith and having an axial extent greater than said portion to be trimmed away and having said uneven edge;

a second shaft rotatably mounted in said housing and having first and second end portions and having a relatively fixed central axis of rotation which is substantially parallel to said central axis of rotation of said first shaft;

said second shaft being located radially outwardly from said first shaft;

additional drive means for rotating said first and second shafts;

said additional drive means rotating said first and second shafts so that for each revolution of said turret said first shaft makes three complete revolutions and said second shaft makes one complete revolution;

a radially outer knife having an arcuate cutting edge having a radius and an arcuate extent great enough so that it can contact the outer surface of said untrimmed portion and cooperate with said radially inner knife to trim said portion having said uneven edge from said trimmed can body;

first mounting means for mounting said radially outer knife on said second shaft for rotation therewith;

knurling means for cooperating with said knurling roller to cut and knurl said trimmed away portion; and second mounting means for mounting said knurling means on said second shaft for rotation therewith.

12. Apparatus as in claim 11 and further comprising:

said arcuate cutting edge having a leading portion and a trailing portion;

said knurling means comprise an arcuate segment having a leading portion and a trailing portion;

said leading portion of said arcuate segment being circumferentially spaced from said trailing portion of said arcuate cutting edge; and said leading portion of said arcuate cutting edge being circumferentially spaced from said trailing portion of said arcuate segment.

13. Apparatus as in claim 12 wherein:

said circumferential distance between said leading portion of said arcuate cutting edge and said trailing portion of said arcuate segment is substantially greater than the circumferential distance between said leading portion of said arcuate segment and said trailing portion of said arcuate cutting edge.

14. Apparatus as in claim 13 and further comprising:

said arcuate cutting edge having a leading portion and a trailing portion;

said knurling means comprise an arcuate segment having a leading portion and a trailing portion;

said leading portion of said arcuate segment being circumferentially spaced from said trailing portion of said arcuate cutting edge;

said leading portion of said arcuate cutting edge being circumferentially spaced from said trailing portion of said arcuate segment; and said circumferential distance between said leading portion of said arcuate cutting edge and said trailing portion of said arcuate segment is substantially greater than the circumferential distance between said leading portion of said arcuate segment and said trailing portion of said arcuate cutting edge.

15. Apparatus as in claim 11 wherein said additional drive means comprises:

a stationary gear surrounding said drive means;

a first gear rotatably mounted on said turret for rotation therewith and in mesh with said stationary gear so that rotation of said turret rotates said first gear;

a second gear mounted on said first shaft and in mesh with said first gear so that said rotation of said first gear rotates said second gear and said first shaft;

a third gear mounted on said first shaft for rotation therewith; and a fourth gear mounted on said second shaft and in mesh with said third gear so that rotation of said third gear rotates said fourth gear and said second shaft.

16. Apparatus as in claim 11 wherein said drive means comprises:

a stationary gear surrounding said drive means;

a first gear mounted on said first shaft and in mesh with said stationary gear so that said rotation of said turret rotates said first gear and said first shaft;

a second gear mounted on said first shaft for rotation therewith; and a third gear mounted on said second shaft and in mesh with said second gear so that rotation of said second gear rotates said third gear and said second shaft.

* * * * *